United States Patent [19]

Kannabiran

[11] Patent Number: 5,148,509
[45] Date of Patent: Sep. 15, 1992

[54] COMPOSITE BUFFER OPTICAL FIBER CABLES

[75] Inventor: Rengan Kannabiran, Big Flats, N.Y.
[73] Assignee: Corning Incorporated, Corning, N.Y.
[21] Appl. No.: 674,796
[22] Filed: Mar. 25, 1991
[51] Int. Cl.$^5$ ............................................. G02B 6/44
[52] U.S. Cl. ................................... 385/109; 385/113
[58] Field of Search ............... 385/100, 102, 103, 107, 385/109, 111, 112, 113

[56] References Cited

U.S. PATENT DOCUMENTS

| | | | |
|---|---|---|---|
| Re. 33,459 | 11/1990 | Bohannon, Jr. et al. | 385/107 |
| 4,365,865 | 12/1982 | Stiles | 385/101 |
| 4,515,435 | 5/1985 | Anderson | 385/107 |
| 4,541,686 | 9/1985 | Barfuss et al. | 385/107 |
| 4,629,286 | 12/1986 | Fuse et al. | 385/128 |
| 4,641,916 | 2/1987 | Ostreich | 385/102 |
| 4,645,297 | 2/1987 | Yoshihara | 385/128 |
| 4,659,174 | 8/1987 | Ditscheid et al. | 385/113 |
| 4,723,831 | 2/1988 | Johnson et al. | 385/113 |
| 4,730,894 | 3/1988 | Arroyo | 385/113 |
| 4,737,012 | 4/1988 | Murakami et al. | 385/102 |
| 4,741,594 | 5/1988 | Suzuki | 385/115 |
| 4,756,600 | 7/1988 | Ramsay et al. | 385/106 |
| 4,763,982 | 8/1988 | Greveling | 385/109 |
| 4,770,489 | 9/1988 | Saito et al. | 385/113 |
| 4,776,910 | 10/1988 | Taylor et al. | 385/113 |
| 4,778,245 | 10/1988 | Ueno et al. | 385/113 |
| 4,779,953 | 10/1988 | Ohta et al. | 385/103 |
| 4,783,138 | 11/1988 | Oestreich | 385/108 |
| 4,795,234 | 1/1989 | Nakasone | 385/102 |
| 4,807,961 | 2/1989 | Mullin et al. | 385/102 |
| 4,822,133 | 4/1989 | Peacock | 385/112 |
| 4,826,278 | 5/1989 | Gartside, III et al. | 385/105 |
| 4,844,575 | 7/1989 | Kinard et al. | 385/113 |

FOREIGN PATENT DOCUMENTS

| | | |
|---|---|---|
| 284667 | 10/1988 | European Pat. Off. |
| 2086607 | 5/1982 | United Kingdom |
| 2185828 | 7/1987 | United Kingdom |

OTHER PUBLICATIONS

Mahlke, G. and Gossing, P., *Fiber Optic Cables—Fundamentals, Cable Technology, Installation Practice*, pp. 96–108, 1987, published by John Wiley & Sons, Limited, Chichester, Great Britain.
*The Fiber Optic Catalog—Fiber Optic Components of the Universal Transport System*, pp. 1.2, 1.3 and 1.20, published by Siecor Corp., Hickory, N.C., 1988.

*Primary Examiner*—John D. Lee
*Assistant Examiner*—John Ngo
*Attorney, Agent, or Firm*—K. McNeill Taylor, Jr.

[57] ABSTRACT

Single fiber cables of the composite buffer type are provided which include: (a) a central optical waveguide fiber; (b) a layer of fill compound surrounding the optical fiber; (c) a layer of aramid fiber surrounding the fill compound; and (d) a plastic jacket surrounding the layer of aramid fiber. Multi-fiber cables are also provided which include: (a) a plurality of optical waveguide fibers; (b) a layer of aramid fiber surrounding the optical fibers; (c) fill compound in contact with the inner surface of the layer of aramid fiber and with the optical fibers; and (d) a plastic jacket surround the layer of aramid fiber. Methods for producing cables of these types are disclosed.

24 Claims, 3 Drawing Sheets

COMPOSITE BUFFER OPTICAL FIBER CABLES

BACKGROUND OF THE INVENTION

1. Field of the Invention

This invention relates to optical fiber cables and, in particular, to improved optical fiber cables of the composite buffer type.

2. Description of the Prior Art

As is well known in the art, optical waveguide fibers experience high increases in attenuation when subjected to tensile, bending or torsion strains and are sensitive to crack growth (fatigue) and breakage. Accordingly, extensive efforts have been made to develop protective coverings for fibers which will provide a "buffer" between the fiber and its surroundings.

Three general types of protective coverings have been recognized in the art: 1) loose tube buffers, 2) tight buffers, and 3) composite buffers. See Mahlke, G. and Gossing, P., *Fiber Optic Cables*, John Wiley and Sons Limited, New York, 1987, pages 96–108. Other specialized constructions have also been developed. See, for example, Saito et al., U.S. Pat. No. 4,770,489, which discusses the use of a grooved spacer core to carry a group of fibers, wherein the grooves are filled with a soft jelly-like material, the spacer is surrounded with a layer of aramid fiber, and the aramid fiber is surrounded by a plastic jacket.

In the basic loose tube construction, one or more fibers are surrounded by a protective tube which is spaced from the fiber(s) by a distance sufficient to allow the fiber(s) to move radially within the tube in response to applied stresses. The spacing is normally at least equal to the radius of the fiber, i.e., the spacing is on the order of at least about 125 microns. To accommodate spacings of this magnitude, the overall diameters of loose tube cables are generally quite large, being on the order of 1,400–2,000 microns for single fiber cables and 2,800–3,000 microns multi-fiber cables.

Typically, the space between the fiber(s) and the loose tube is filled with a water resistant compound, e.g., a grease or a thixotropic gel, so as to protect the fiber(s) from water absorption in case the wall of the protective tube should become broken during installation or use. See, for example, Greveling, U.S. Pat. No. 4,763,982, which discloses a loose tube construction comprising 1) an outer jacket and 2) an inner tube composed of strength members, such as aramid fibers, embedded in a resin carrier, the inner tube being filled with a thixotropic water blocking medium: and Peacock, U.S. Pat. No. 4,822,133, which discloses the use of water blocking grease in a loose tube construction. See also Kinard et al., U.S. Pat. No. 4,844,575, Gartside, III et al., U.S. Pat. No. 4,826,278, Taylor et al., U.S. Pat. No. 4,776,910, Arroyo, U.S. Pat. No. 4,730,894, and Johnson et al., U.S. Pat. No. 4,723,831.

Various constructions for the tube portion of loose tube cables have been disclosed. For example, Siecor Corporation of Hickory, N.C., has sold "Fan-Out Tubing" composed of a PVC outer jacket, a layer of aramid yarn, and a fluoropolymer inner tube. Protective tubes having this composition and an inside diameter (ID) of 400 microns have been used with fibers having an outside diameter of 250 microns to form a loose tube construction. Tubes having the same composition but a larger inside diameter, i.e., 1,000 microns, have been used as an added layer of protection for 900 micron tight buffered fibers. See *The Fiber Optic Catalog*—1988-1989, page 1.20, 1988.

Other loose tube examples include Ditscheid et al., U.S. Pat. No. 4,659,174, which discloses a construction in which at least one optical fiber is embedded in a bundle of strength fibers, such as aramid fibers, and that combination is surrounded by a protective mantle; and UK Patent Application No. 2,185,828 which discloses the use of embedded aramid fibers as strength members in a loose tube construction.

The second type of buffer—the tight buffer—is used with single fibers. In this construction, the protective tube is applied directly to the fiber so that the fiber and the tube are in contact along substantially their entire length, rather than being spaced apart as in a loose tube construction. This change allows the overall diameter of the buffered fiber to be reduced to approximately 900 microns. The buffered fiber is built up to larger diameters as cable.

Again, a variety of constructions have been proposed for the protective tube. For example, Siecor Corporation has sold "Interconnection Cables" composed of a PVC outer jacket, a layer of stranded aramid yarn, and a layer of a polyester elastomer in direct contact with the fiber. See *The Fiber Optic Catalog*—1988-1989, pages 1.2 and 1.3, 1988.

Other tight buffer examples include Ueno et al., U.S. Pat. No. 4,778,245, which discloses a construction in which a tension resistant material (polyester fibers in the reference example; polyethylene terephthalate yarns and aramid fiber yarns in the comparative examples) is applied directly to an optical waveguide fiber and the resulting structure coated with a synthetic resin such as polyethylene; Ramsay et al., U.S. Pat. No. 4,756,600, which discloses a construction comprising a urethane acrylate primary coating, a silicone rubber secondary coating, and a nylon tertiary coating; Suzuki, U.S. Pat. No. 4,741,594, which discloses a construction comprising a silicone resin in contact with a fiber and surrounded by strength members which are held in place by a layer of tape which, in turn, is surrounded by a sheath of polyvinyl chloride or a similar material; and Stiles, U.S. Pat. No. 4,365,865, which discloses a construction in which a layer of silicone rubber surrounds the fiber, a layer of fiber-reinforced resin, such as an epoxy resin reinforced with aramid fibers, surrounds the silicone rubber layer, and a layer of polypropylene surrounds the fiber-reinforced layer.

Other multi-layer tight buffer constructions employing fiber-reinforced layers can be found in Fuse et al., U.S. Pat. No. 4,629,286, Yoshihara et al., U.S. Pat. No. 4,645,297, Nakasone et al., U.S. Pat. No. 4,795,234, UK Patent Application No. 2,078,996, and EPO Patent Publication No. 284,667. Other constructions employing a layer of non-embedded strength members can be found in Ohta et al., U.S. Pat. No. 4,779,953, and UK Patent Application No. 2,086,607.

The composite buffer construction, like the tight buffer construction, has been used, prior to the present invention, to protect single fibers. In this construction, the fiber is separated from the tube by a distance of between about 50 and about 100 microns, i.e., the composite buffer construction differs from the tight buffer construction in that the tube and the fiber are substantially mechanically decoupled from one another and differs from the loose tube construction in that the spacing between the fiber and the tube is less than the radius of the fiber. The space between the fiber and the tube is normally filled with a fill compound to provide water protection for the fiber. As a result of the use of a reduced space between the fiber and the tube, composite buffer cables have had an overall diameter similar to that of tight buffer cables, i.e., an outside diameter of about 900 microns.

Although composite buffer constructions have worked successfully in various applications, they have suffered from a number of problems. First, although their 900 micron outside diameters represent an improvement over the loose tube construction, this diameter is still too large for applications in which space is at a premium. For example, an important application for optical waveguide fibers is in the field of cable television. For this application, the fibers are installed in existing electrical plenums which typically have small cross-sectional areas. For large buildings, e.g., apartment buildings, numerous fibers must be carried by each plenum. Accordingly, even an outside diameter of 900 microns is often considered too large for this application.

In addition to the size problem, composite buffer constructions and, in particular, composite buffer constructions having small diameters, have had inferior protective properties. Specifically, prior to the present invention, composite buffer constructions have not included strength members. Such members have not been used because they are difficult to incorporate in a composite buffer construction while maintaining a controlled spacing between the fiber and the protective tube. Also, the inclusion of strength members is known to increase the overall size of the cable which would defeat one of the primary reasons for using the composite buffer construction.

Significantly, as discussed in detail below, the present invention provides methods for including aramid strength members in a composite buffer cable and, at the same time, reducing the cable's outside diameter below 900 microns. That is, in accordance with the invention, both the size problem and the protective property problem of the prior composite buffer constructions have been addressed and solved simultaneously.

In addition to the size and space problems, prior to the present invention, multi-fiber cables having a composite buffer construction have not been produced. That is, the art has not produced a cable in which multiple fibers are 1) surrounded by a protective tube, 2) mechanically decoupled from the tube, and 3) closely spaced to the tube so as to produce a high fiber packing density. As discussed in detail below, the present invention provides such a construction and thus satisfies the long standing need in the art for a cable having a high packing density and superior performance characteristics.

SUMMARY OF THE INVENTION

In view of the foregoing state of the art, it is an object of the present invention to provide improved optical fiber cables of the composite buffer type. More particularly, it is an object of the invention to provide composite buffer cables having reduced outside diameters. It is a further object of the invention to provide composite buffer cables which incorporate protective strength members. In addition, it is an object of the invention to provide composite buffer cables which have both a reduced diameter and incorporate protective strength members.

In addition to the foregoing objects, it is also an object of the invention to provide cables of the composite buffer type which include multiple fibers, e.g., eight fibers.

To achieve the foregoing and other objects, the invention in accordance with certain of its aspects provides a composite buffer cable comprising:
(a) an optical waveguide fiber, e.g., an acrylate-coated fiber;
(b) a layer of fill compound surrounding the optical waveguide fiber;
(c) a layer of aramid fiber surrounding the fill compound; and
(d) a plastic Jacket surrounding the layer of aramid fiber;
wherein the inner diameter of the layer of aramid fiber is less than about twice the diameter of the optical waveguide fiber. In certain preferred embodiments of the invention, the plastic jacket has an outside diameter (OD) of less than 900 microns, e.g., on the order of 600 microns.

In accordance with other aspects of the invention, a method for producing optical fiber cables, including cables having the above structure, is provided which comprises the steps of: (a) coating an optical waveguide fiber with a layer of fill compound, (b) applying aramid fibers to the layer of fill compound, and (c) coating the resulting structure with a plastic jacket. In certain preferred embodiments of these aspects of the invention, step (b) is performed by (i) applying a plurality of continuous yarns of aramid fiber to the layer of fill compound, e.g., three yarns, and (ii) passing the resulting structure through a die having a circular cross-section.

In accordance with further aspects of the invention, a multi-fiber cable of the composite buffer type is provided which comprises:
(a) a plurality of optical waveguide fibers, e.g., eight fibers:
(b) a layer of aramid fiber surrounding the optical waveguide fibers;
(c) fill compound in contact with the inner surface of the layer of aramid fiber and with the optical waveguide fibers, said fill compound substantially filling the space between the optical waveguide fibers and the inner surface of the layer of aramid fiber; and
(d) a plastic jacket surround the layer of aramid fiber;
wherein the ratio of the combined cross-sectional areas of the optical waveguide fibers to the cross-sectional area within the layer of aramid fiber is greater than about 0.4.

In accordance with additional aspects of the invention, a method for producing multi-fiber cables, including cables having the above structure, is provided which comprises the steps of:
(a) coating a central optical waveguide fiber with a first layer of fill compound;
(b) applying a plurality of optical waveguide fibers to the first layer of fill compound, e.g., seven fibers;
(c) coating the structure resulting from step (b) with a second layer of fill compound;
(d) applying aramid fibers to the second layer of fill compound; and
(e) coating the structure resulting from step (d) with a plastic material.

In certain preferred embodiments of this method, step (d) is performed by (i) applying a plurality of continuous yarns of aramid fiber to the second layer of fill compound, e.g., seven yarns, and (ii) passing the resulting structure through a die having a circular cross-section.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to single fiber and multi-fiber cables of the composite buffer type.

The invention can be used with a variety of optical waveguide fibers now known or subsequently developed, including, without limitation, single mode and multimode fibers, silica-based and nonsilica-based fibers, and plastic fibers. A typical fiber which can be used with the invention is a silica-based, single mode fiber having an overall diameter of approximately 250 microns and comprising a core having a diameter of approximately 10 microns, a cladding having an outside diameter of approximately 125 microns, and two coatings of UV curable acrylate polymers, the inner coating having a lower modulus than the outer coating. One such fiber which may be used is Titan ®-SMF-28 Optical Fiber, commercially available from Corning Incorporated, Corning, N.Y. Fibers of this type were used in constructing the cables described below.

Figure 1:
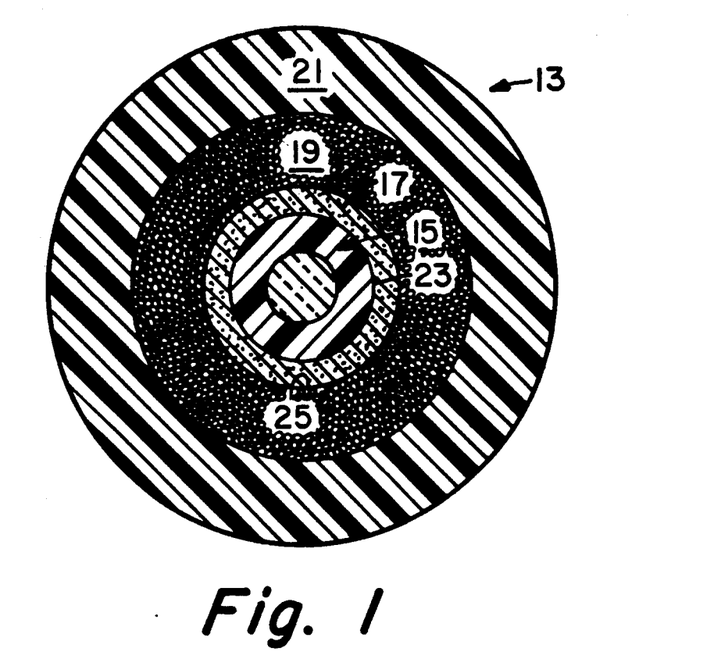
FIG. 1 is a cross-sectional view of a composite buffer cable constructed in accordance with the invention.

A cross-section of a composite buffer cable 13 prepared in accordance with the invention is shown in FIG. 1. As illustrated in this figure, the cable includes an optical fiber 15, a layer of fill compound 17, a layer of aramid fiber 19, and a plastic jacket 21. The overall structure of the cable is radially symmetric so as to provide protection for the fiber in all directions which is an important advantage of the invention.

As can be seen in FIG. 1, outer surface 23 of optical waveguide fiber 15 and inner surface 25 of aramid layer 19 are spaced apart by a sufficient distance so that the optical waveguide fiber is mechanically decoupled from the aramid layer and the plastic jacket. This decoupling is important in order to maintain proper optical performance of the optical waveguide fiber in the finished cable. In general, the ratio between the inside diameter ($D_2$) of the aramid layer and the outside diameter ($D_1$) of the optical waveguide fiber should be between about 1.3 and about 2.0 to achieve this mechanical decoupling while still providing a small overall diameter ($D_3$) for cable 13. Within this range, the space between surfaces 23 and 25 is preferably on the order of 35 to 75 microns for a 250 micron optical waveguide fiber.

Because optical waveguide fiber 15 is mechanically decoupled from aramid layer 19 and plastic jacket 21, it is possible to pull the fiber out of short lengths of cable. The length of cable for which this can be done is generally shorter than five meters, i.e., it is generally shorter than the minimum pull-out length for a loose tube construction. For example, the fiber can generally be pulled out of a 0.5 meter length of cable constructed in accordance with the invention.

Fill compound layer 17 is preferably a thixotropic gel, i.e., a gel which liquifies when stirred and returns to a solid state when stirring stops. In the assembled cable, this layer cushions the fiber against low levels of applied stress and at the same time allows the fiber to move within the cable in response to higher stress levels. In addition, the fill compound can protect the optical waveguide fiber from potential damage due to long term exposure to water if plastic jacket 21 should become broken. A typical outside diameter for layer 17 is on the order of 320–340 microns for a 250 micron optical waveguide fiber.

The fill compound should allow the fiber to move within aramid layer 19, but should not flow under its own weight. Also, the fill compound should not chemically interact with plastic jacket 21, aramid layer 19, or the coatings on optical waveguide fiber 15. Commercially available fill compounds currently being used with optical waveguide fibers are composed of mineral oil, a polymer, and either a metallic soap or a silica filler. Among the fill compounds which can be used with the present invention are SYNCOFOX 415 and 330, manufactured by Synco Chemical Corporation, 24 Davinci Drive, Bohemia, N.Y., and LA103 and LA300, manufactured by Huber Chemical, Feldkirchener Strassa 15, D-8011 Kirchhaim-Heimstetien, Germany. Other fill compounds, now known or subsequently developed, having the foregoing physical and chemical properties, can also be used in the practice of the invention.

Aramid layer 19 provides the majority of the overall load-carrying strength and protective properties of the cable. Preferably, this layer is composed of continuous strands of aramid fibrils which run parallel to the longitudinal axis of the cable, i.e., the aramid layer is not stranded around the longitudinal axis of the cable. As shown in FIG. 1, the aramid layer surrounds optical waveguide fiber 15 and thus provides uniform protection for the fiber in all directions. As also shown in this figure, the aramid fibers constitute a separate layer in the overall cable structure, sandwiched between the fill compound and the plastic jacket, and are not embedded in plastic jacket 21. For a fill compound layer having an outside diameter of 320–340 microns, a typical outside diameter for the aramid layer is about 500 microns. In practice, KEVLAR brand aramid yarn sold by E. I. DuPont DeNemours and Company, Wilmington, Del., under the product number 49 and having a denier of 195, has been found to work successfully. Other types of aramid fiber can of course be used if desired.

Plastic jacket 21 provides structural integrity and environmental protection for cable 13. Various polymeric materials known in the art can be used for this layer provided they do not adversely react with other components of the cable. In particular, some polymers can react with some types of fill compounds, and the use of such combinations should be avoided in the practice of the invention. In addition, extra layers of polymeric materials may be applied to build up the exterior of the cable, thus increasing its handleability and abrasion resistance.

Preferred materials for plastic jacket 21 include nylons, polyethylenes, and polyvinyl chlorides, although other materials can be used if desired. Examples of specific materials which have been found to work successfully are: 1) Grade ELY60 nylon, manufactured by Emser Industries, Sumter, S.C., 2) BP D333 medium density polyethylene, manufactured by BP Performance Polymers Inc., Hackettstown, N.J., and 3) GARY 2052 SPECIAL polyvinyl chloride, manufactured by Gary Chemical Corp., Leominster, Mass.

For an aramid layer having an outside diameter of approximately 500 microns, a typical outside diameter for the plastic jacket is around 600 microns. As discussed above, this outside diameter is 33% percent smaller than the typical 900 micron outside diameter of conventional, non-reinforced composite buffer cables. Of course, if desired, the overall diameter of the cable can be readily increased by increasing the thickness of one or more of layers 17, 19, 21, e.g., by increasing the thickness of protective jacket 21.

Figure 2:
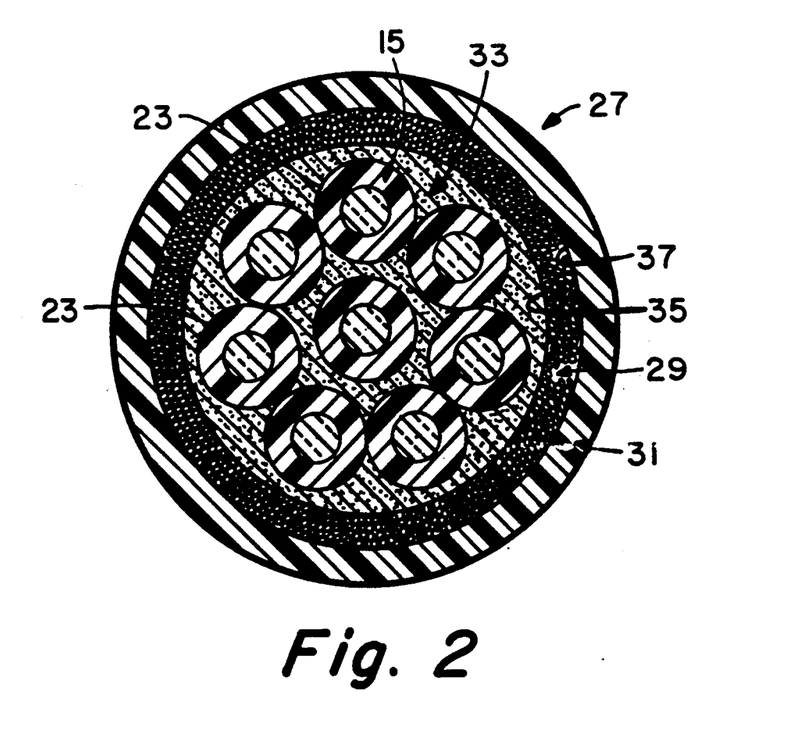
FIG. 2 is a cross-sectional view of a multi-fiber cable of the composite buffer type constructed in accordance with the invention.

A cross-section of a multi-fiber cable 27 prepared in accordance with the invention is shown in FIG. 2. As illustrated in this figure, the cable includes a plurality of optical waveguide fibers 15, a layer of aramid fiber 29, a plastic jacket 31, and fill compound 33 which substantially fills the spaces between adjacent optical waveguide fibers and the spaces between the optical waveguide fibers and the inner surface 35 of the layer of aramid fiber.

As with the single fiber embodiment, the protective portions of the cable, i.e., fill compound, aramid fiber, and plastic jacket, are generally symmetrically arranged relative to the optical waveguide fibers so as to provide protection for the fibers in all directions. This functional symmetry is important since it means that if the cable should stretch in response to applied stress, each of the optical fibers in the cable will be subject to approximately the same force and thus each will suffer about the same small decrease in performance.

Also as in the single fiber embodiment, the optical waveguide fibers and, in particular, the outermost fibers are close to, but spaced from, inner surface 35 of aramid layer 29. In this way, the multi-fiber cable of the invention achieves the mechanical decoupling characteristic of a composite buffer cable. In general, the spacing between surface 35 and the nearest optical waveguide fiber will be less than the radius of the optical waveguide fiber.

As shown in FIG. 2, cable 27 carries a total of eight fibers, i.e., a central fiber and seven surrounding fibers. Other numbers of fibers can be used if desired. For example, a close-packed arrangement having a central fiber and six surrounding fibers will work successfully.

Figure 4:
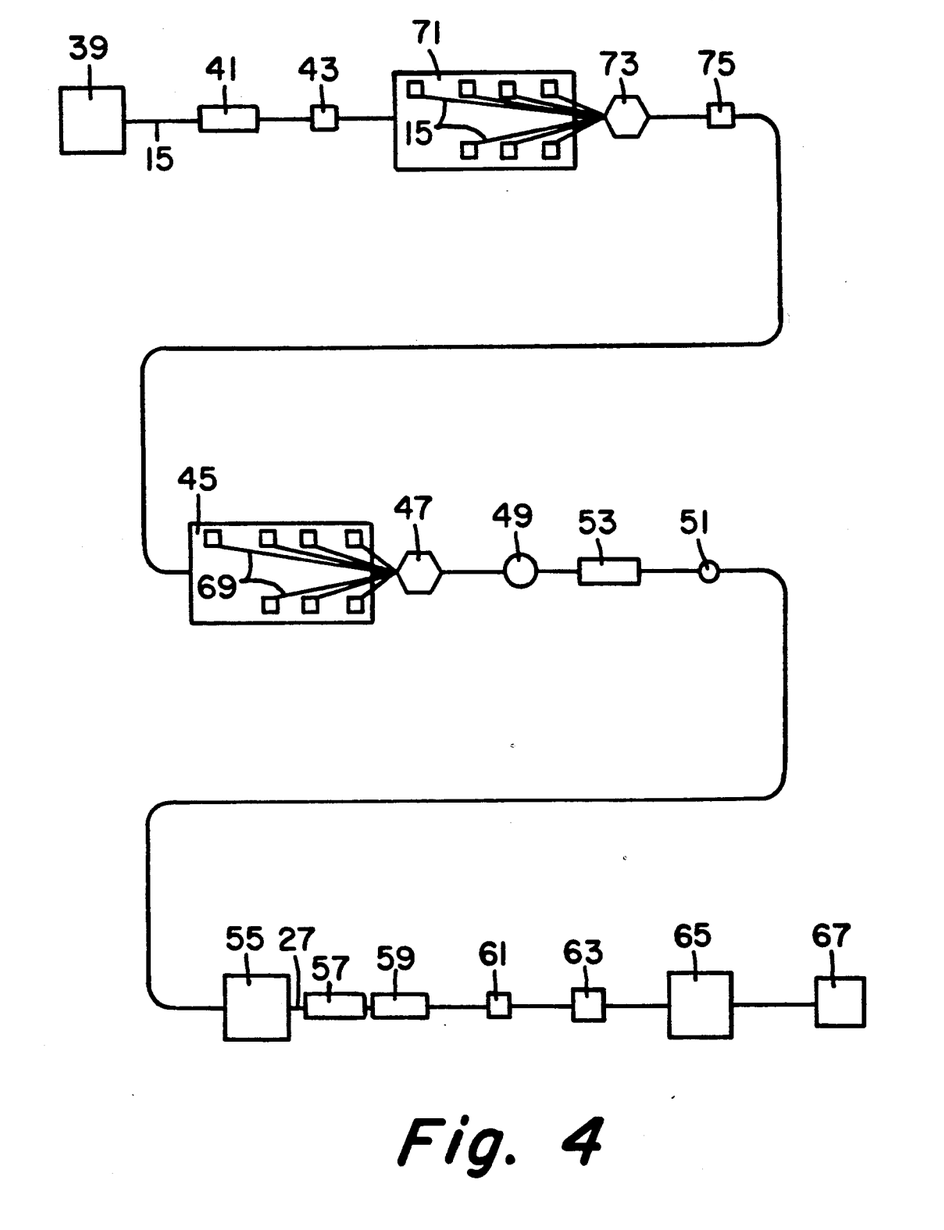
FIG. 4 is a schematic diagram of a preferred process for producing the cable of FIG. 2.

Six or seven surrounding fibers are generally needed to manufacture cable 27 using the method shown in FIG. 4. Cables having less optical fibers can be made by using dummy fibers for the central fiber or some of the surrounding fibers. Optical fibers which have off-spec optical performance can be used as the dummy fibers.

The close-packed structure and the eight fiber structure of FIG. 2 will generally have higher packing densities than other arrangements and thus are preferred. In general, the arrangement and number of optical waveguide fibers and the inner diameter of aramid layer 29 should be chosen so as to produce a high packing density. In particular, those parameters should be chosen so that the ratio of the combined cross-sectional areas of the optical waveguide fibers, to the cross-sectional area within inner surface 35 of aramid layer 29 is at least about 0.4, and preferably about 0.5.

As shown in FIG. 2, optical fibers 15 all have the same diameter. Alternatively, optical fibers having different diameters (and/or different optical properties) can be used in the practice of the invention. For example, the central fiber can have a larger diameter than the surrounding fibers so as to produce a close-packed structure with more than six surrounding fibers.

The considerations discussed above regarding the selection of materials for the single fiber embodiment of FIG. 1 also apply to the multi-fiber embodiment of FIG. 2. Thus, fill compound 33 is preferably a thixotropic gel; aramid layer 29 is preferably composed of continuous strands of aramid fibrils which run parallel to the longitudinal axis of the cable and are not embedded in plastic jacket 31; and plastic jacket 31 is preferably made of nylon, polyethylene, or polyvinyl chloride.

Suitable dimensions for an eight fiber cable having the structure shown in FIG. 2, wherein each optical waveguide fiber has a diameter of 250 microns, are as follows: diameter of surface 35—approximately 1,000 microns; diameter of interface 37 between aramid layer 29 and plastic jacket 31—approximately 1,100 microns; and outside diameter of plastic jacket 31—approximately 1,400 microns. It should be noted that this overall outside diameter for eight fibers is on the order of the typical outside diameter for a loose tube construction for just one fiber, a plainly significant achievement for the present invention.

Figure 3:
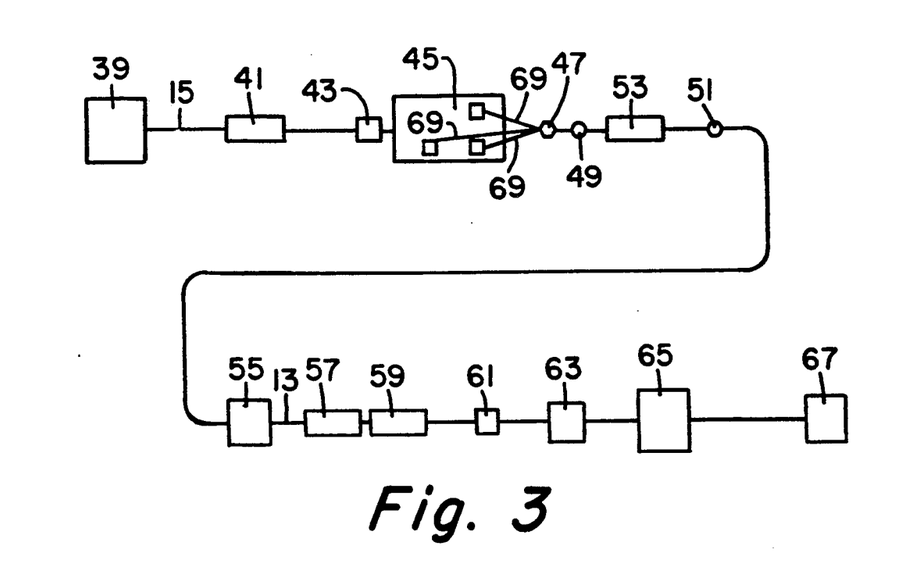
FIG. 3 is a schematic diagram of a preferred process for producing the cable of FIG. 1.

Preferred methods for producing the cables of the present invention are shown schematically in FIGS. 3 and 4 for the single fiber and multi-fiber embodiments, respectively. It is to be understood, of course, that the cables of the invention can be made by other processes than those illustrated in these figures. Similarly, it is to be understood that the discussion of specific operating parameters and equipment set forth below is for the purpose of illustration only and is not intended to limit the scope of the invention in any way.

In outline, FIG. 3 shows a continuous cabling process in which a single optical fiber 15 is coated with fill compound, surrounded by aramid strength members, and then protected with an extruded outer jacket to produce finished cable 13. More particularly, the method involves the following steps.

First, optical fiber 15 is fed from optical fiber payout 39 to fiber drying oven 41. The tension in the fiber as it is paid out is typically about 70 grams. The fiber drying oven operates at a temperature of approximately 100° C. and is used to remove water from the fiber prior to cabling. If the fiber is already sufficiently dry, oven 41 can be omitted.

Next, the fiber passes through fill compound coater assembly 43 where a layer of fill compound is extruded onto the fiber. In practice, it has been found that SYNCOFOX 415 fill compound can be successfully applied to a 250 micron fiber using a coater block having a 0.018" guide die and a 0.016" sizing die. The fill compound is fed onto the fiber using compressed air at a pressure of approximately 10 psi. Using this equipment and a fiber feed rate of approximately one meter/- second, the diameter of the coated fiber as it leaves coater assembly 43 is approximately 350 microns.

Three yarns of aramid fiber 69 are then applied to the coated optical fiber by means of multiple payout assembly 45, spacing ring 47, first guide die 49, second guide die 51, and heating oven 53.

Spacing ring 47 serves to equally space the aramid yarns around the coated fiber. A suitable spacing ring comprises an aluminum disc with a hole in the center for the coated optical fiber and three, equally-spaced dies for the aramid yarns.

First guide die 49 brings yarns 69 close to the coated fiber. For a 350 micron coated fiber and three, 195 denier, aramid yarns, first guide die 49 can have an opening of around 50 mil. After passing through the first guide die, the coated fiber and the aramid yarns pass through drying oven 53 which operates at about 100° C. and serves to remove moisture from the yarn.

Next, the coated fiber and the three yarns pass through second aramid guide die 51, which is located directly in front of extrusion coater 55. Die 51 causes the three yarns to spread around the coated fiber so as to produce aramid fiber layer 19 (see FIG. 1). The die ensures the circularity of the optical fiber/fill compound/aramid fiber composite and allows precise positioning of the composite prior to the application of plastic jacket 21. Die 51 can be formed from a piece of stainless steel hypodermic tubing having an ID of approximately 0.025". For a 350 micron coated fiber and aramid yarns of the type described above, the outside diameter of the aramid fiber layer produced by a die of this type is approximately 500 microns.

Extrusion coater 55 is used to apply plastic jacket 21 to aramid fiber layer 19. An extrusion crosshead having a 0.075" die, a 0.050" tip, and an 18 gauge stainless steel central tube mounted in the bore of the tip has been found to work successfully in applying molten ELY 60 nylon at a temperature of approximately 215° C. to a 500 micron diameter aramid layer to produce a final jacket diameter of approximately 600 microns. The optical fiber/fill compound/aramid fiber composite is passed through the bore of the central tube (ID equal to approximately 0.038"), and a vacuum of approximately 2–5" of mercury is applied to the inlet of the central tube so as to pull the jacket down around the aramid fiber layer.

After leaving the extruder, the completed cable is passed through hot water cooling trough 57 and then cold water cooling trough 59. The hot water trough is placed 4" downstream from the exit face of the extruder and is operated at a temperature of approximately 45° C., while the cold water trough operates at a temperature of approximately 10° C. Both troughs can be 5 meters long.

Excess water is stripped from the fiber by vacuum air wipe 61, after which the fiber passes through diameter gauge 63 and metering capstan 65 which together control the line speed of the process so as to produce finished cable having the desired outside diameter. Finally, the cable is wound into reels using winder 67.

The process illustrated in FIG. 4 for producing multi-fiber cable is similar to that of FIG. 3 and analogous elements of the two processes have been identified by the same reference numbers. In outline, FIG. 4 shows a continuous cabling process in which a single optical fiber 15 is coated with fill compound, a plurality of optical fibers, e.g., seven fibers, are evenly configured around the coated central fiber, the resulting structure is coated with more fill compound, surrounded by aramid strength members, e.g., seven aramid yarns, and then protected with an extruded outer jacket to produce finished cable 27. More particularly, the method involves the following steps.

First, as in the process for producing single fiber cables, optical fiber 15 is fed from optical fiber payout 39 to fiber drying oven 41, and then to fill compound coater assembly 43 where a layer of fill compound is extruded onto the fiber. Parameters similar to those used for producing single fiber cable can be used for this portion of the multi-fiber process so that for an optical fiber having a diameter of 250 microns, the coated fiber leaving assembly 43 has an outside diameter of approximately 350 microns.

In practice, SYNCOFOX 330 fill compound has been found preferable to SYNCOFOX 415 in manufacturing multi-fiber cable. The 330 material can withstand somewhat higher force levels than the 415 material before changing into its liquid state and thus is better able to withstand the extra processing steps needed to produce the multi-fiber cable. In order to process the 330 material through coater assembly 43, a pressure of approximately 20 psi was used, rather than the 10 psi value used with the 415 material. Although 330 material is preferred, multi-fiber cables have been successfully made using the 415 material.

After the central optical fiber has been coated with fill compound, a plurality of additional optical fibers, e.g., seven fibers, are applied to the central fiber by means of multiple payout assembly 71 and spacing ring 73. Spacing ring 73 evenly configures these peripheral fibers around the coated central fiber. The optical fibers are laid down parallel to the longitudinal axis of the central fiber and are not stranded. Note that when seven peripheral fibers are used, a close-packed configuration is not produced and thus the peripheral fibers are not, in general, in contact with the central fiber.

The resulting multi-fiber structure is then fed into fill compound coater assembly 75 where an additional coating of fill compound is applied. Coater 75 can apply either the same or a different fill compound from that applied by coater 43. For seven peripheral fibers, each having a 250 micron diameter, a coater having a 0.043" guide die and a 0.041" sizing die has been found to work successfully. Using this coater operated at 30 psi and the SYNCOFOX 330 fill material, eight-fiber coated structures having an outside diameter of approximately 1,000 microns have been successfully produced.

Multiple yarns of aramid fiber 69, e.g., seven yarns, are then applied to the fill-compound/multifiber composite by means of multiple payout assembly 45, spacing ring 47, first guide die 49, second guide die 51, and heating oven 53. These components perform the functions described above in connection with the single fiber component. Preferably, the individual yarns of aramid fiber are aligned with the cusps between adjacent peripheral optical fibers. For an eight-fiber structure of the type described above, suitable dimensions for the first guide die 49 and the second guide die 51 are 0.055" and 0.045", respectively. Using dies of this type, the outside diameter of the aramid-coated composite as it leaves die 49 is approximately 1,125 microns.

The final steps in the production of the multi-fiber cable involve the application of protective jacket 31 using extrusion coater 55, hot water cooling trough 57, cold water cooling trough 59, vacuum air wipe 61, diameter gauge 63, metering capstan 65, and winder 67, each of which operates in the manner described above for the single fiber embodiment, except that a vacuum in extrusion coater 55 is not necessary.

For an eight-fiber, aramid-coated composite of the type described above, an extrusion crosshead having a 0.136" die, a 0.109" tip, and an 12 gauge (0.085" inside diameter) stainless steel central tube has been found to work successfully in applying molten ELY 60 nylon at a temperature of approximately 215° C. to the composite. A higher hot water cooling trough temperature than that used with the single fiber process, i.e., a temperature of 75° C., has been found suitable for this extrusion. The finished cable produced by this apparatus had an outside diameter of approximately 1,400 microns when the process was run at a line speed of approximately 1.25 meters/second.

The specific values set forth above for operating temperatures, air pressures, die sizes, line speeds, and the like will vary with different cable configurations, sizes and materials. The determination of the appropriate parameters for any particular application will be evident to persons of ordinary skill in the art from the disclosure herein.

Cables prepared in accordance with the above procedures were subjected to a variety of performance tests and were found to operate successfully in all respects.

Figure 5:
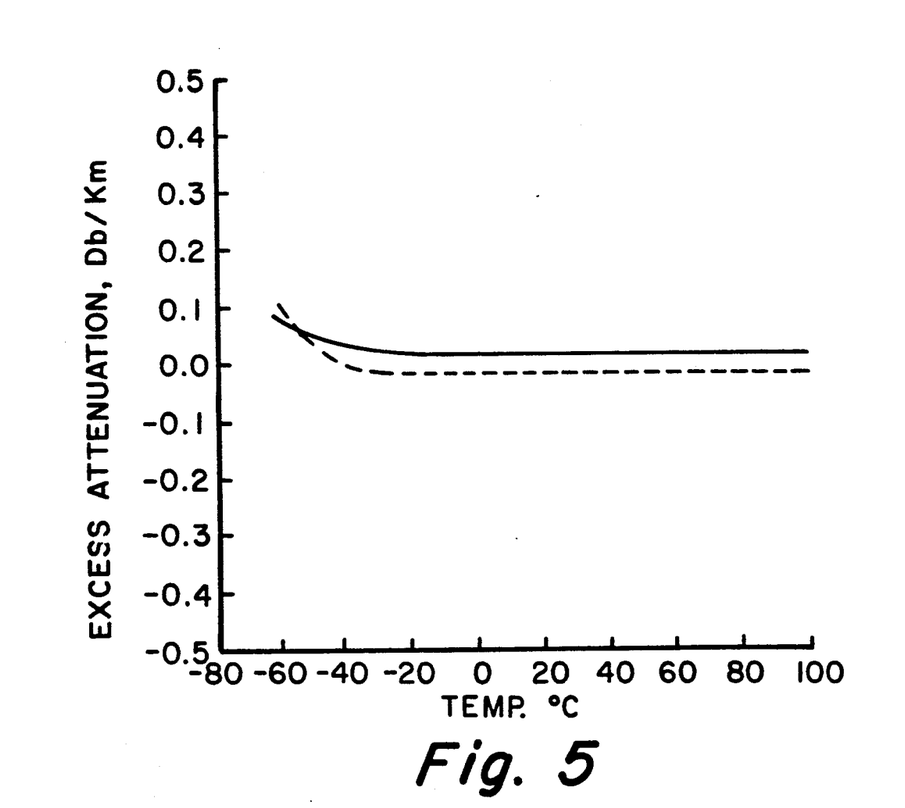
FIG. 5 is a plot of excess attenuation (dB/kilometer) versus temperature (°C.) for a single fiber, composite buffer cable constructed in accordance with the invention. The data points along the solid line represent the change in attenuation at 1300 nanometers, while the data points along the dashed line represent the change at 1550 nanometers.

In particular, the change in attenuation of a single-fiber, composite buffer cable constructed in accordance with the invention as a function of temperature was measured by placing a loosely-coiled, one-kilometer length of cable in an oven and measuring the attenuation as the temperature was varied between $-60°$ C. and $+80°$ C. The results are shown in FIG. 5, where the straight line represents the behavior at 1,300 nanometers, and the dashed line represents the behavior at 1,550 nanometers. As shown in this figure, the cable exhibited minimal changes in attenuation over the $-20°$ C. to $+80°$ C. range, and only slightly greater changes in the range from $-20°$ C. to $-60°$ C.

Similar experiments on an eight-fiber cable showed that the multi-fiber structure also has excellent thermal properties. In particular, the increases in attenuation between room temperature and 0° C. for each of the eight fibers in a cable were measured. All of the fibers exhibited less than a 0.1 dB/Km increase in loss, except for two fibers which exhibited a slightly higher increase at 1,550 nm, but still less than 0.25 dB/Km.

Experiments were also performed to measure the effects of bending on a single fiber cable. In these experiments, 100 turns of cable were wrapped around an aluminum mandrel having a diameter of $75 \pm 2$ millimeters, and a spectral attenuation cutback procedure was used to determine the effect of this bending on the fiber's attenuation. The experiment showed essentially no attenuation increase in the typical operating ranges of around 1300 and 1550 nanometers, i.e., the cable had excellent resistance to bending losses.

Using a one-meter length of single fiber cable, a water penetration test was performed. In this test, a one meter static head of water pressure was continuously applied to one end of the cable for a period of one hour. No leakage of water from the other end of the cable was observed.

Load (creep) tests were performed on a single fiber cable prepared in accordance with the invention and, for comparison, on a 600 micron, nylon-jacketed, tight-buffered fiber. In this test, a 2 pound weight was hung from a section of cable and the elongation as a function of time was measured. The experiments were performed at room temperature. The inventive cable was found to have an elongation of about 0.15 percent, which did not increase with time. The tight-buffered nylon fiber, on the other hand, had an elongation more than four-times greater, i.e., about 0.7 percent.

Tests to simulate the installation of multi-fiber cables in an existing conduit were performed using cable bundles containing up to twenty-five eight-fiber cables, i.e., a total of 200 fibers. The bundles were pulled through a conduit which was 90 feet long, included one 45° bend and two 90° bends, and had an inner diameter of 0.44". Neither breaks nor damage to individual fibers was observed even after multiple passes through the conduit and rough handling. Also, there was no visual evidence of abrasion to the cable's outer jacket, which in these experiments was made of nylon. Comparisons between cables which had been pulled through the conduit and those which had not, showed that pulling did not alter the loss characteristics of the optical fibers, i.e., the protective structure of the cable performed successfully and protected the fibers from losses due to applied forces.

Although specific embodiments of the invention have been described and illustrated, it is to be understood that modifications can be made without departing from the invention's spirit and scope. For example, depending upon the application, the cables of the present invention can include other protective layers known in art outside of plastic jackets 21 and 31, such as, polymer or metal coatings for rodent and/or lightning protection. Similarly, multiple single fiber cables can be bundled together in a polymer or metal sheath to produce a larger cable having individually-protected fibers. Similar constructions can be prepared using the multi-fiber embodiments of the invention.

With regard to the process aspects of the invention, numerous methods for applying the various layers of the cable can be used besides the preferred methods discussed above. For example, in addition to extrusion coating, the outer plastic jacket can also be applied by solvent casting, dip coating, fluidized bed coating, spray coating, thermoforming, or the like. Moreover, rather than being performed as an off-line procedure, the cabling process can be integrated as part of the overall fiber production process.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A composite buffer cable comprising:
    (a) a single optical waveguide fiber having an outer coating, said outer coating having a diameter $D_1$;
    (b) a first layer of fill compound surrounding the optical waveguide fiber;
    (c) a second layer of aramid fiber surrounding and in contact with the fill compound, said second layer having an inner diameter $D_2$ which is less than about twice $D_1$; and
    (d) a plastic jacket surrounding the layer of aramid fiber.

2. The cable of claim 1 wherein the fill compound is a thixotropic gel.

3. The cable of claim 1 wherein the plastic jacket is composed of a material selected from the group consisting of nylon, polyethylene, and polyvinyl chloride.

4. The cable of claim 1 wherein the plastic jacket has an outer diameter $D_3$ which is less than 900 microns.

5. The cable of claim 4 wherein $D_3$ is about 600 microns.

6. The cable of claim 1 wherein the optical waveguide fiber comprises a core, a cladding, and at least one coating of a plastic material.

7. A multifiber cable having a longitudinal axis which comprises:
   (a) a plurality of optical waveguide fibers, each said fiber including an outer coating having a diameter of less than or equal to about 250 μm, the combined cross-sectional areas of the fibers being $A_1$;
   (b) a layer of aramid fiber surrounding the plurality of optical waveguide fibers, said layer having an inner surface and said inner surface having a cross-sectional area in a direction orthogonal to the longitudinal axis of $A_2$, the ratio of $A_1$ to $A_2$ being at least about 0.4;
   (c) fill compound in contact with the inner surface of the layer of aramid fiber and with the optical waveguide fibers, said fill compound substantially filling the space between the optical waveguide fibers and the inner surface of the layer of aramid fiber; and
   (d) a plastic jacket surrounding the layer of aramid fiber.

8. The cable of claim 7 wherein the $A_1/A_2$ ratio is about 0.5

9. The cable of claim 7 wherein the plurality of optical waveguide fibers comprise a central fiber surrounded by seven fibers which run parallel to the longitudinal axis of the cable.

10. The cable of claim 7 wherein the fill compound is a thixotropic gel.

11. The cable of claim 7 wherein the plastic jacket is composed of a material selected from the group consisting of nylon, polyethylene, and polyvinyl chloride.

12. The cable of claim 7 wherein each of the optical waveguide fibers comprises a core, a cladding, and at least one coating of a plastic material.

13. The cable of claim 7 wherein the outside diameter of the plastic jacket is less than about 1,500 microns.

14. The cable of claim 7 wherein at least one additional layer of polymeric material is applied to said plastic jacket.

15. A method for preparing a composite buffer cable comprising:
   (a) providing an optical waveguide fiber;
   (b) coating the optical waveguide fiber with a layer of fill compound;
   (c) applying aramid fibers to tee layer of fill compound; and
   (d) coating the structure resulting from step (c) with a plastic material.

16. The method of claim 15 wherein step (c) comprises the steps of:
   (i) applying a plurality of continuous yarns of aramid fiber to the layer of fill compound; and
   (ii) passing the resulting structure through a die having a circular cross-section.

17. The method of claim 15 wherein the fill compound is a thixotropic gel.

18. The method of claim 15 wherein the cable has an outer diameter which is less than 900 microns.

19. A method for preparing a multi-fiber cable comprising:
   (a) providing an optical waveguide fiber;
   (b) coating the optical waveguide fiber with a first layer of fill compound;
   (c) applying a plurality of optical waveguide fibers to the first layer of fill compound;
   (d) coating the structure resulting from step (c) with a second layer of fill compound;
   (e) applying aramid fibers to the second layer of fill compound; and
   (f) coating the structure resulting from step (e) with a plastic material.

20. The method of claim 19 wherein step (e) comprises the steps of:
   (i) applying a plurality of continuous yarns of aramid fiber to the second layer of fill compound; and
   (ii) passing the resulting structure through a die having a circular cross-section.

21. The method of claim 19 wherein the fill compound is a thixotropic gel.

22. The method of claim 19 wherein seven optical waveguide fibers are applied to the first layer of fill compound in step (c).

23. The method of claim 19 wherein the cable has an outer diameter which is less than about 1,500 microns.

24. The method of claim 19 including the further step of applying at least one additional layer of polymeric material to the structure resulting from step (f).

* * * * *